(12) United States Patent
Kuramashi et al.

(10) Patent No.: US 10,557,443 B2
(45) Date of Patent: *Feb. 11, 2020

(54) EXHAUST DEVICE OF ENGINE

(71) Applicant: MAZDA MOTOR CORPORATION, Hiroshima (JP)

(72) Inventors: Taku Kuramashi, Hatsukaichi (JP); Keishi Kitabatake, Hiroshima (JP); Tamotsu Takamure, Hiroshima (JP); Toshiaki Kamo, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 43 days.

This patent is subject to a terminal disclaimer.

(21) Appl. No.: 15/905,467

(22) Filed: Feb. 26, 2018

(65) Prior Publication Data

US 2018/0258886 A1 Sep. 13, 2018

(30) Foreign Application Priority Data

Mar. 10, 2017 (JP) ................................ 2017-046563
Nov. 22, 2017 (JP) ................................ 2017-224924

(51) Int. Cl.
| | | |
|---|---|---|
| F02M 26/15 | (2016.01) | |
| F01N 13/08 | (2010.01) | |
| F01N 3/10 | (2006.01) | |
| F01N 3/035 | (2006.01) | |
| F01N 3/021 | (2006.01) | |
| F01N 13/00 | (2010.01) | |
| F02B 75/20 | (2006.01) | |

(52) U.S. Cl.
CPC ............ *F02M 26/15* (2016.02); *F01N 3/021* (2013.01); *F01N 3/035* (2013.01); *F01N 3/101* (2013.01); *F01N 13/0097* (2014.06); *F01N 13/08* (2013.01); *F01N 2340/02* (2013.01); *F01N 2470/18* (2013.01); *F02B 75/20* (2013.01); *Y02A 50/2324* (2018.01); *Y02T 10/22* (2013.01)

(58) Field of Classification Search
CPC ...... F01N 13/0097; F01N 13/08; F01N 3/021; F01N 3/035; F01N 3/101; F01N 2340/02; F01N 2470/18; F02M 26/15; F02B 75/20; Y02A 50/2324; Y02T 10/22
See application file for complete search history.

(56) References Cited

U.S. PATENT DOCUMENTS

2012/0198838 A1* 8/2012 Bruck ................. F01N 13/1805
60/605.1

FOREIGN PATENT DOCUMENTS

| JP | 2004-176554 A | 6/2004 |
|---|---|---|
| JP | 2012-031782 A | 2/2012 |
| JP | 2012031782 A * | 2/2012 |

OTHER PUBLICATIONS

Machine Translation of JP-2012031782-A (Year: 2012).*

* cited by examiner

*Primary Examiner* — Brandon D Lee
(74) *Attorney, Agent, or Firm* — Studebaker & Brackett PC

(57) ABSTRACT

An exhaust-gas discharge port to discharge a main flow of exhaust gas passing through an exhaust-gas purifying device is provided at a position which is offset, on one side, from a center axis of the purifying-device body, and an EGR-gas takeout port is provided at a position which is offset, on an opposite side to the exhaust-gas discharge port, from the center axis of the purifying-device body.

13 Claims, 7 Drawing Sheets

EXHAUST DEVICE OF ENGINE

BACKGROUND OF THE INVENTION

The present invention relates to an exhaust device of an engine.

Conventionally, an exhaust-gas purifying device to purify exhaust gas is provided in an exhaust path of an automotive-vehicle engine, such as a diesel engine or a gasoline engine.

Further, EGR (Exhaust Gas Recirculation) in which a part of the exhaust gas which has passed through the exhaust-gas purifying device and been purified is recirculated to an intake system is adopted for preventing engine knocking or reducing nitrogen oxide NOx (see Japanese Patent Laid-Open Publications 2004-176554 and 2012-031782, for example).

Herein, in a case where an EGR path is branched from a downstream side of the exhaust-gas purifying device, if this EGR path is branched from a cone portion or a flange which are continuous to a main exhaust path of a case of the exhaust-gas purifying device, there is a concern that the flow (ventilation) resistance may improperly increase because of interference of a flow of the exhaust gas flowing in the main exhaust path with a flow of the exhaust gas flowing toward the EGR path.

SUMMARY OF THE INVENTION

Accordingly, an object of the present invention is to provide an exhaust device of an engine provided with the EGR which can properly suppress increasing of the flow resistance by reducing flow interference of the exhaust gas.

The present invention is an exhaust device of an engine which comprises an exhaust-gas purifying device provided on an exhaust path of the engine and comprising a purifying-device body to purify exhaust gas discharged from the engine which is housed in a case thereof, and an EGR device connected to a downstream side, in an exhaust-gas flow direction, of the exhaust-gas purifying device and recirculating a part of the exhaust gas passing through the purifying-device body as EGR gas to an intake system of the engine, wherein an exhaust-gas discharge port is provided at a downstream-side end portion of the case of the exhaust-gas purifying device at a position which is offset from a center axis of the purifying-device body, an EGR-gas takeout port is provided at the downstream-side end portion of the case of the exhaust-gas purifying device at a position which is offset, on an opposite side to the exhaust-gas discharge port, from the center axis of the purifying-device body, and the EGR device is provided on the same side as the EGR-gas takeout port relative to the center axis of the purifying-device body.

According to the present invention, the EGR gas can be taken out from the downstream side of the exhaust-gas purifying device, suppressing the interference with the exhaust-gas flow to the exhaust-gas discharge port, so that the increasing of the flow resistance can be properly suppressed and also pipe arrangement of the EGR device can be made properly compact.

In an embodiment of the present invention, a downstream portion of an L-shaped exhaust pipe which is configured to be bent in a L shape is connected to an upstream side, in the exhaust-gas flow direction, of the exhaust-gas purifying device, and the EGR-gas takeout port is offset, on an outer-peripheral side of L-shaped bending of the L-shaped exhaust pipe, from the center axis of the purifying-device body.

In this case, when the exhaust gas passes through the L-shaped exhaust pipe, a lot of exhaust gas flows into the exhaust-gas purifying device, passing through the outer-peripheral side of the L-shaped bending of the L-shaped exhaust pipe because of its inertia. Consequently, the amount of the exhaust gas flowing through a portion which corresponds to the outer-peripheral side of the L-shaped bending of the exhaust-gas purifying device becomes large. Whereas, since the EGR-gas takeout port is offset, on the outer-peripheral side of the L-shaped bending, from the center axis of the purifying-device body, i.e., on a side where the flow amount of the exhaust gas of the exhaust-gas purifying device is large, the exhaust gas easily flows to the EGR-gas takeout port. Accordingly, the EGR performance can be properly secured.

In another embodiment of the present invention, the exhaust device of the engine further comprises an upstream-side exhaust-gas purifying device which is connected to an upstream portion of the L-shaped exhaust pipe, wherein a downstream portion of the upstream-side exhaust-gas purifying device is configured to overlap a portion of an upstream-side end face of the exhaust-gas purifying device, when viewed in an axial direction of the exhaust-gas purifying device.

The exhaust-gas purifying device which is provided on the downstream side of the above-described upstream-side exhaust-gas purifying device will be referred to as the downstream-side exhaust-gas purifying device. Herein, the above-described structure in which the upstream-side exhaust-gas purifying device is connected to the upstream portion of the L-shaped exhaust pipe and the downstream portion of the upstream-side exhaust-gas purifying device is configured to overlap the portion of the upstream-side end face of the downstream-side exhaust-gas purifying device means a structure in which the downstream portion of the upstream-side exhaust-gas purifying device overlaps the portion of the upstream-side end face of the downstream-side exhaust-gas purifying device on an inner-peripheral side of the L-shaped bending of the L-shaped exhaust pipe, i.e., on a side where the exhaust-gas discharge port is provided.

In the downstream-side exhaust-gas purifying device, the exhaust gas does not easily flow into the portion of its upstream-side end face which the upstream-side exhaust-gas purifying device overlaps. However, the upstream-side exhaust-gas purifying device and the downstream-side exhaust-gas purifying device overlap each other on the side of the exhaust-gas discharge port where a larger amount of exhaust gas flows out, compared to the EGR-gas takeout port. Accordingly, a large amount of exhaust gas which flows toward the exhaust-gas discharge port flows into a portion (a so-called shade portion) of the downstream-side exhaust-gas purifying device where the upstream-side exhaust-gas purifying device overlaps. That is, since the above-described portion (shade portion) of the downstream-side exhaust-gas purifying device also serves as the exhaust-gas purifying potion effectively in spite of partially overlapping of the both exhaust-gas purifying devices as described above, a use (utilization) efficiency of the downstream-side exhaust-gas purifying device does not decrease greatly.

Therefore, according to this embodiment, the exhaust device can be made properly compact as a whole by the above-described overlapping of the both exhaust-gas purifying devices, properly suppressing the decrease of the use efficiency of the downstream-side exhaust-gas purifying device.

In an embodiment of the present invention, the exhaust-gas purifying device is provided inside an engine room of an automotive vehicle, the EGR-gas takeout port is provided below a center of the downstream-side end portion of the case of the exhaust-gas purifying device, and an EGR path of the EGR device is configured to extend upward from a base end side thereof which is connected to the EGR-gas takeout port to a tip side thereof which is connected to the intake system.

According to this embodiment, condensed water which has been generated inside the EGR path can be prevented from staying there.

In an embodiment of the present invention, a space portion which has a bottom portion positioned below the EGR-gas takeout port is formed inside the case at a position located on a downstream side of the purifying-device body.

According to this embodiment, even if the condensed water generated inside the EGR path flows reversely into the case of the exhaust-gas purifying device, it can be prevented that this water stays in the space portion so that the EGR-gas takeout port is closed with the staying water, and this condensed water can be discharged out of the exhaust-gas discharge port.

In an embodiment of the present invention, the exhaust device further comprises a first support member which connects the case of the exhaust-gas purifying device and an EGR pipe constituting the EGR path and a second support member which supports a portion of the EGR pipe which is located between the EGR-gas takeout port and a connection portion where the first support member is connected.

According to this embodiment, the exhaust-gas purifying device can be supported by the second support member via the EGR pipe and the first support member.

In an embodiment of the present invention, the engine is an in-line multi-cylinder engine, and the exhaust-gas purifying device is provided such that the center axis of the purifying-device body is substantially vertical to a cylinder row direction of the engine and is offset, on an arrangement side of the EGR device, from a center position, in the cylinder row direction, of the engine.

According to this embodiment, the EGR path extending from the EGR-gas takeout port provided at the downstream-side end portion of the exhaust-gas purifying device to the intake system of the engine can be arranged along an end portion, in the cylinder row direction, of the engine body, so that the EGR path can be made properly simple.

Herein, in the present description, an expression of "being substantially vertical to a cylinder row direction of the engine" means "having an angle of 80-100° relative to the cylinder row direction of the engine."

Other features, aspects, and advantages of the present invention will become apparent from the following descriptions which refer to the accompanying drawings.

DETAILED DESCRIPTION OF THE INVENTION

Figure 1:
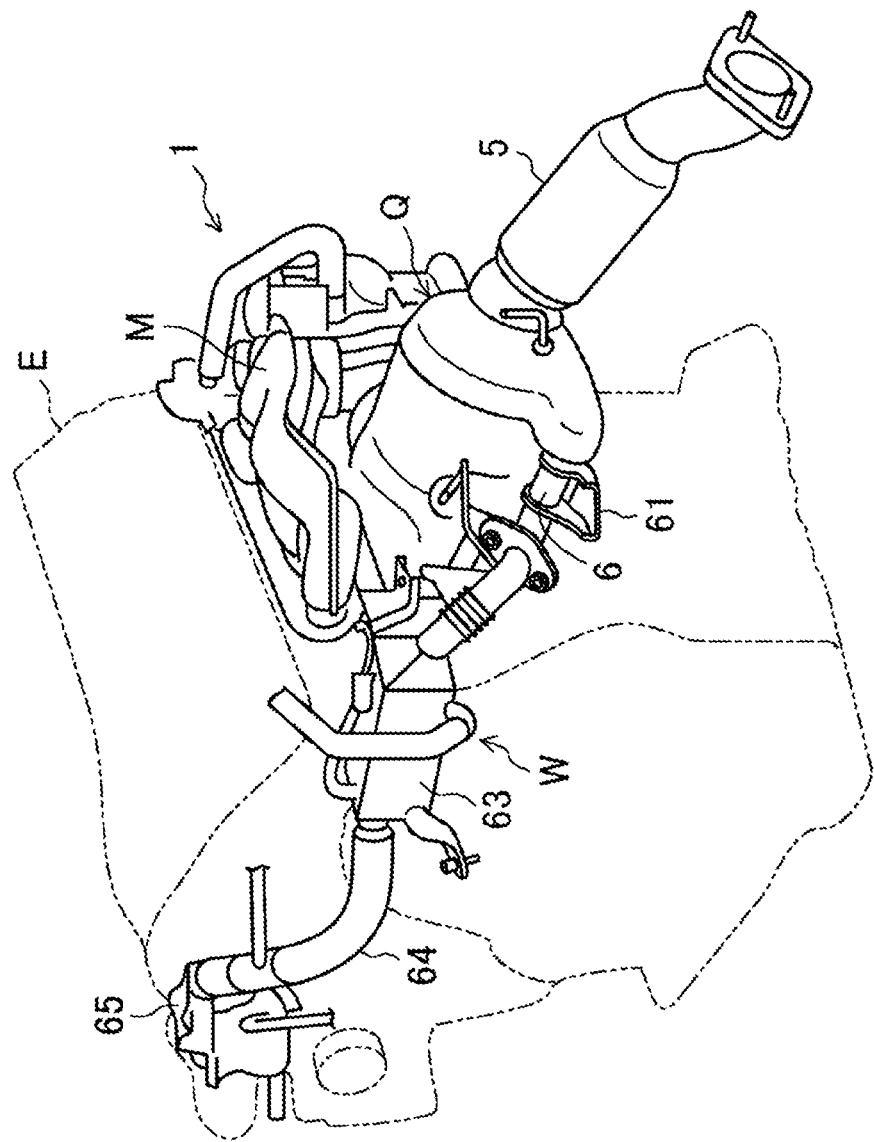
FIG. 1 is a perspective view of an engine provided with an exhaust device according to a first embodiment.

Hereafter, embodiments of the present invention will be described specifically referring to the drawings. The following descriptions about the preferred embodiments exemplify the present invention substantially, which are not to limit applications or usages of the present invention at all.

Embodiment 1

<Engine>

An engine, to which an exhaust device 1 according to a first embodiment is applied, is an in-line four-cylinder gasoline engine (in-line multi-cylinder engine) which is installed to an automotive vehicle. The engine is disposed laterally at a front portion of a FF vehicle.

Herein, the present invention is applicable not only to this four-cylinder gasoline engine but to any other multi-cylinder engine or a diesel engine. Further, the present exhaust device 1 is applicable not only to the FF vehicle but to any other layout-type vehicles, such as a RR vehicle or a 4WD vehicle, including a motorcycle.

The engine has an engine body E which comprises a cylinder block E1 and a cylinder head E2 as shown in FIG. 1. While detailed illustrations are omitted here, first through fourth cylinders which are formed by the cylinder block E1 and the cylinder head E2 are arranged in line in a direction vertical to a paper surface. A combustion chamber of each cylinder is formed by a cylinder bore (not illustrated) of the cylinder block E1, a piston (not illustrated) which is arranged inside the cylinder bore, and the cylinder head E2.

Four exhaust ports (not illustrated) which are respectively connected to the four combustion chambers are formed at the cylinder head E2. Exhaust gas which is generated inside the combustion chambers is discharged to the outside of the vehicle through an exhaust path including these exhaust ports.

<Exhaust Path>

Figure 2:
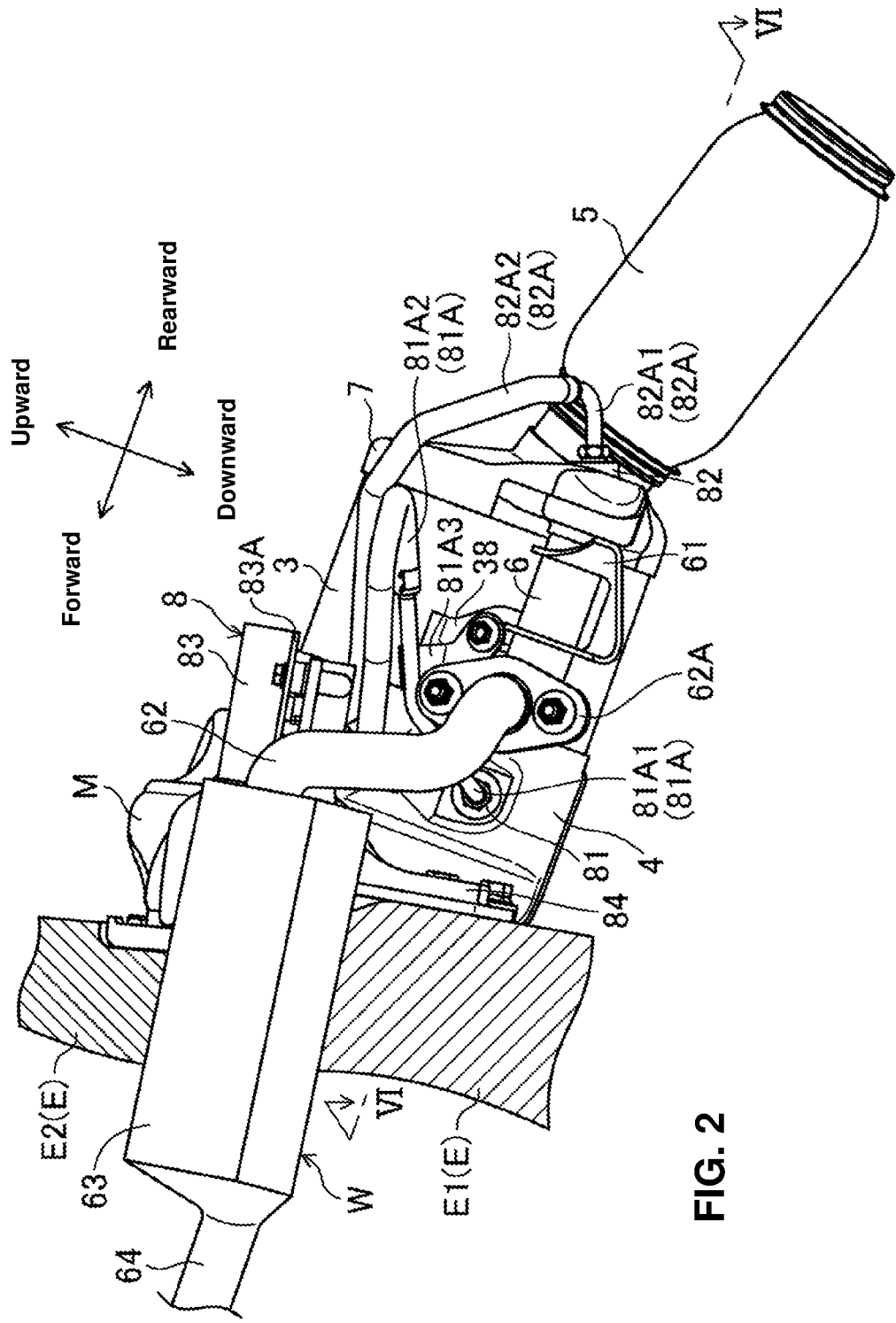
FIG. 2 is a side view showing a part of the exhaust device.

As shown in FIGS. 1 and 2, the exhaust device 1 according to the present embodiment is connected to the above-described exhaust ports, and a downstream-side exhaust system (not illustrated) which is continuous to the vehicle outside is connected to a downstream side of the exhaust device 1. Thus, an exhaust path of the engine comprises the above-described exhaust ports, the exhaust device 1, and the downstream-side exhaust system.

<Exhaust Device>

Figure 3:
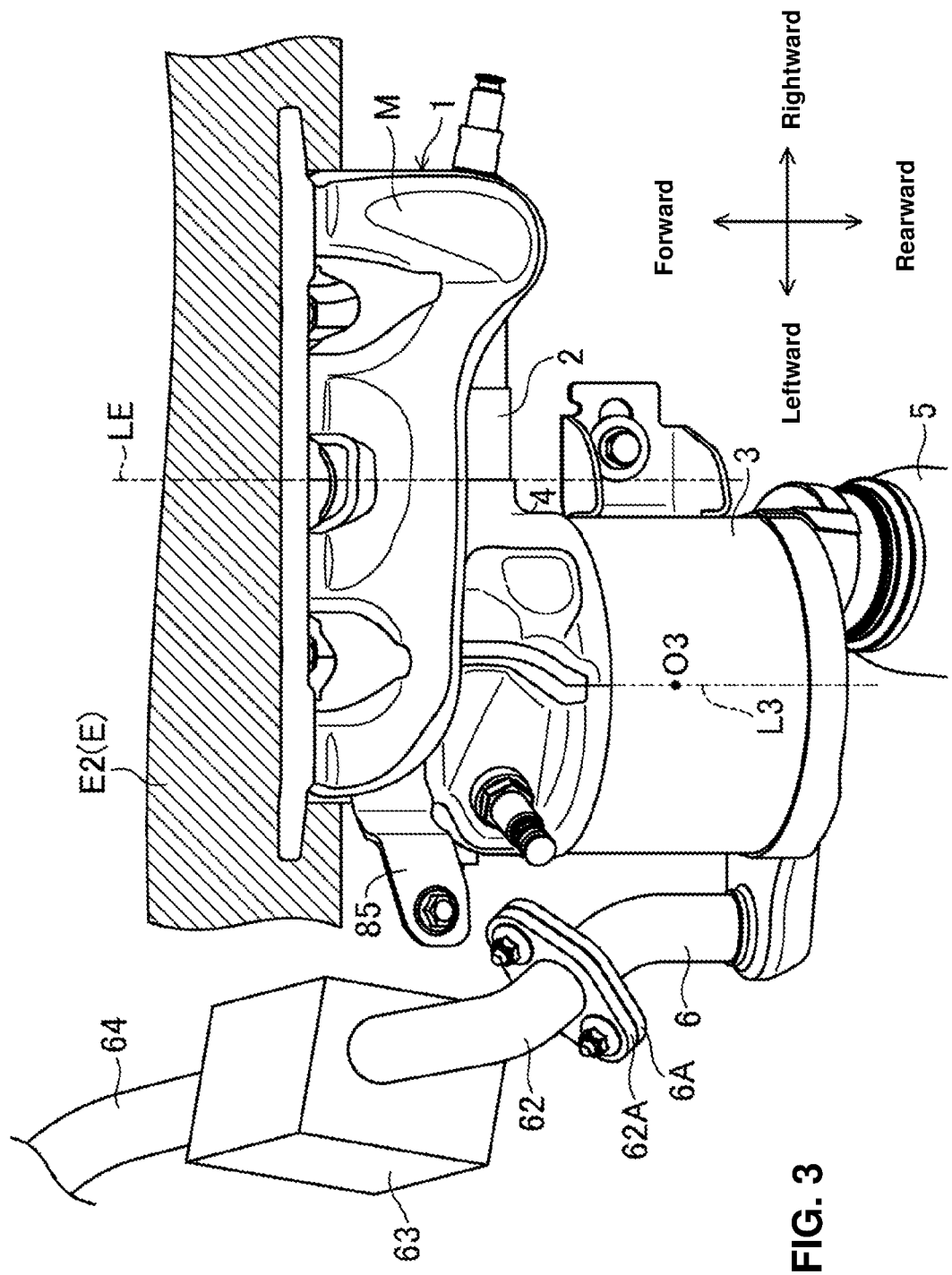
FIG. 3 is a plan view showing the part of the exhaust device.

The exhaust device 1 according to the present embodiment comprises, as shown in FIGS. 1-3, an exhaust manifold M which is connected to the four exhaust ports of the engine body E, an exhaust-gas purifying device Q which is connected to a downstream-end outlet M7 of the exhaust manifold M via a connection portion N, and an EGR device W to recirculate a part of the exhaust gas which has passed through the exhaust-gas purifying device Q to an intake system.

<Exhaust Manifold and Connection Portion>

Figure 4:
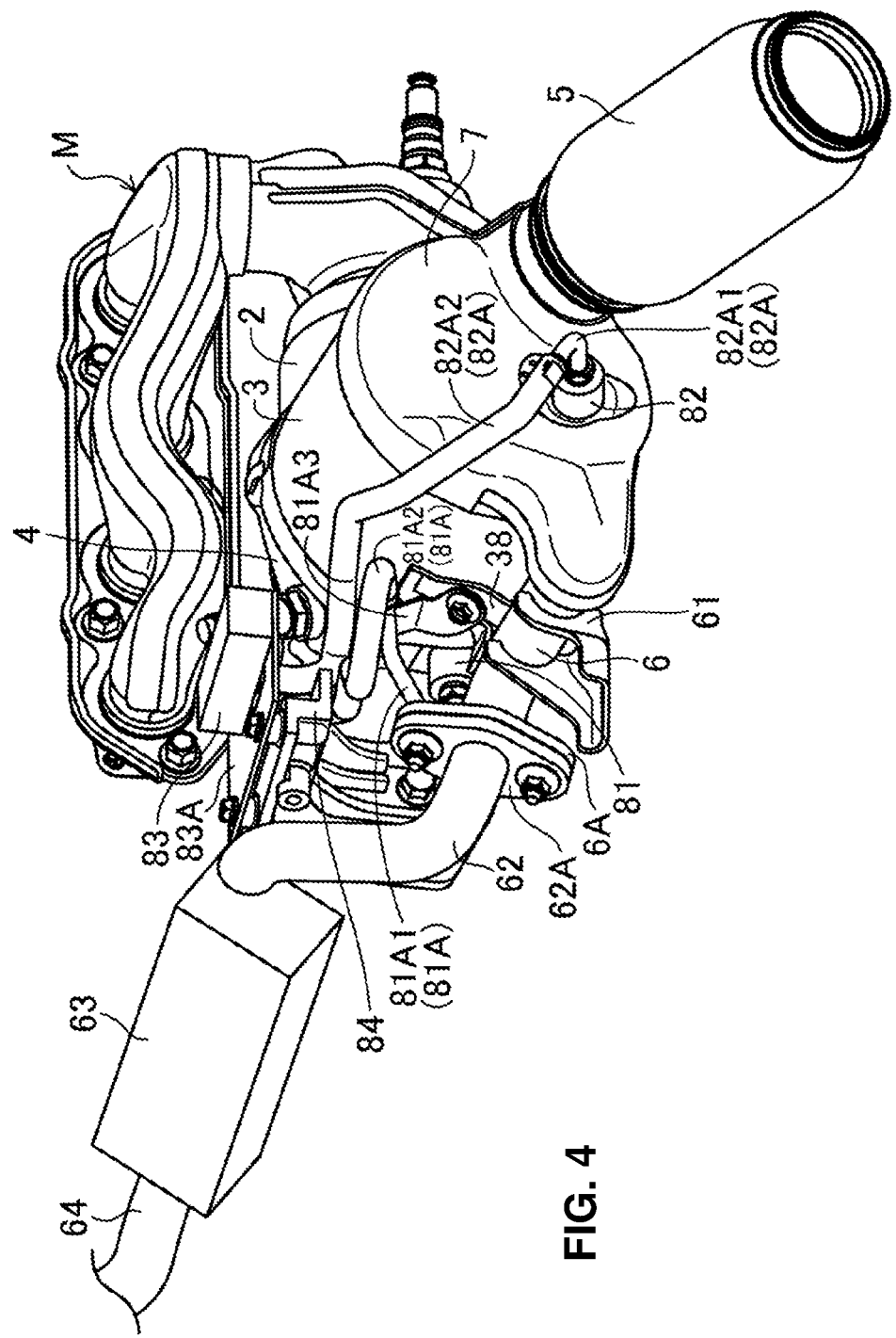
FIG. 4 is a perspective view of the part of the exhaust device, when viewed from an upper-left rearward side.
Figure 5:
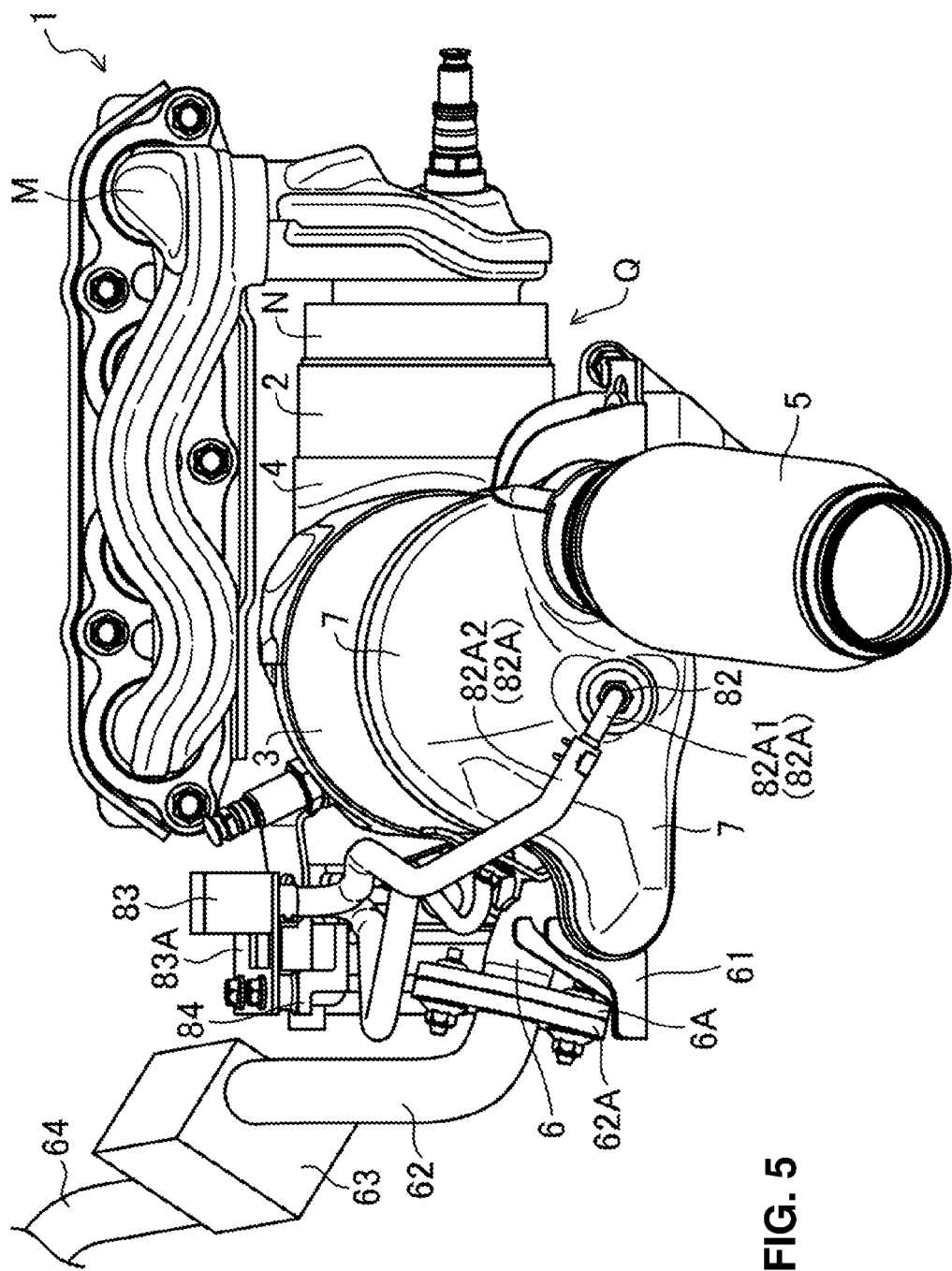
FIG. 5 is a back view of the exhaust device.

The exhaust gas which is discharged from four combustion chambers of the engine through the exhaust ports is supplied from the exhaust manifold M to the exhaust-gas purifying device Q via the connection portion N. As shown in FIGS. 3-5, respective independent exhaust pipes which are connected to the four exhaust ports and a collective pipe which is arranged on one end side in a cylinder row direction are provided. This collective pipe, to which the four independent exhaust pipes are connected, extends downward.

The connection portion N is a tube-shaped member which introduces the exhaust gas from the collective pipe of the exhaust manifold M into the exhaust-gas purifying device Q.

<Direction>

A "vertical direction" and a "longitudinal direction" which are used in the present description are, as shown in FIG. 2, defined based on the directions where the cylinder head E2 is positioned at an upward side of the engine body E, the cylinder block E1 is positioned at a downward side of the engine body E, and the exhaust manifold M is positioned on a rearward side of the engine body E. Further, a "lateral direction" means, as shown in FIG. 3, a direction of a cylinder row of the engine body E, in other words, a direction vertical to the paper surface of FIG. 2, where a near side means a leftward side and a far side means a rightward side. Moreover, an "upstream" and a "downstream" may mean respectively an "upstream side in the flowing direction of the exhaust-gas discharged from the combustion chamber through the exhaust port" and a "downstream side in the flowing direction of the exhaust-gas discharged from the combustion chamber through the exhaust port."

Herein, in the present embodiment, a "longitudinal direction" is parallel to a center axis L3 of a gasoline particulate filter 3 (hereafter, referred to as "GPF 3") which will be described later.

<Exhaust-Gas Purifying Device>

The exhaust-gas purifying device Q comprises, as shown in FIGS. 3-5, a three-way catalyst 2 as an upstream-side exhaust-gas purifying device which is connected to the outlet of the connection portion N, a GPF (gasoline particulate filter) 3 as a downstream-side exhaust-gas purifying device which is arranged on the downward side of the three-way catalyst 2, and an L-shaped exhaust pipe 4 which interconnects the three-way catalyst 2 and the GPF 3.

<Three-Way Catalyst>

The three-way catalyst 2 is a catalyst for purifying hydrocarbon HC, carbon monoxide CO, and nitrogen oxide NOx in the exhaust gas. While specific descriptions are omitted here, the three-way catalyst 2 is made by coating a catalyst component which is formed by carrying noble metal, such as Pt, Pd or Rh, to a metal-oxide made support onto a honeycomb carrier. The three-way catalyst 2 is not to be limited to this in particular, but any known type is applicable.

Figure 6:
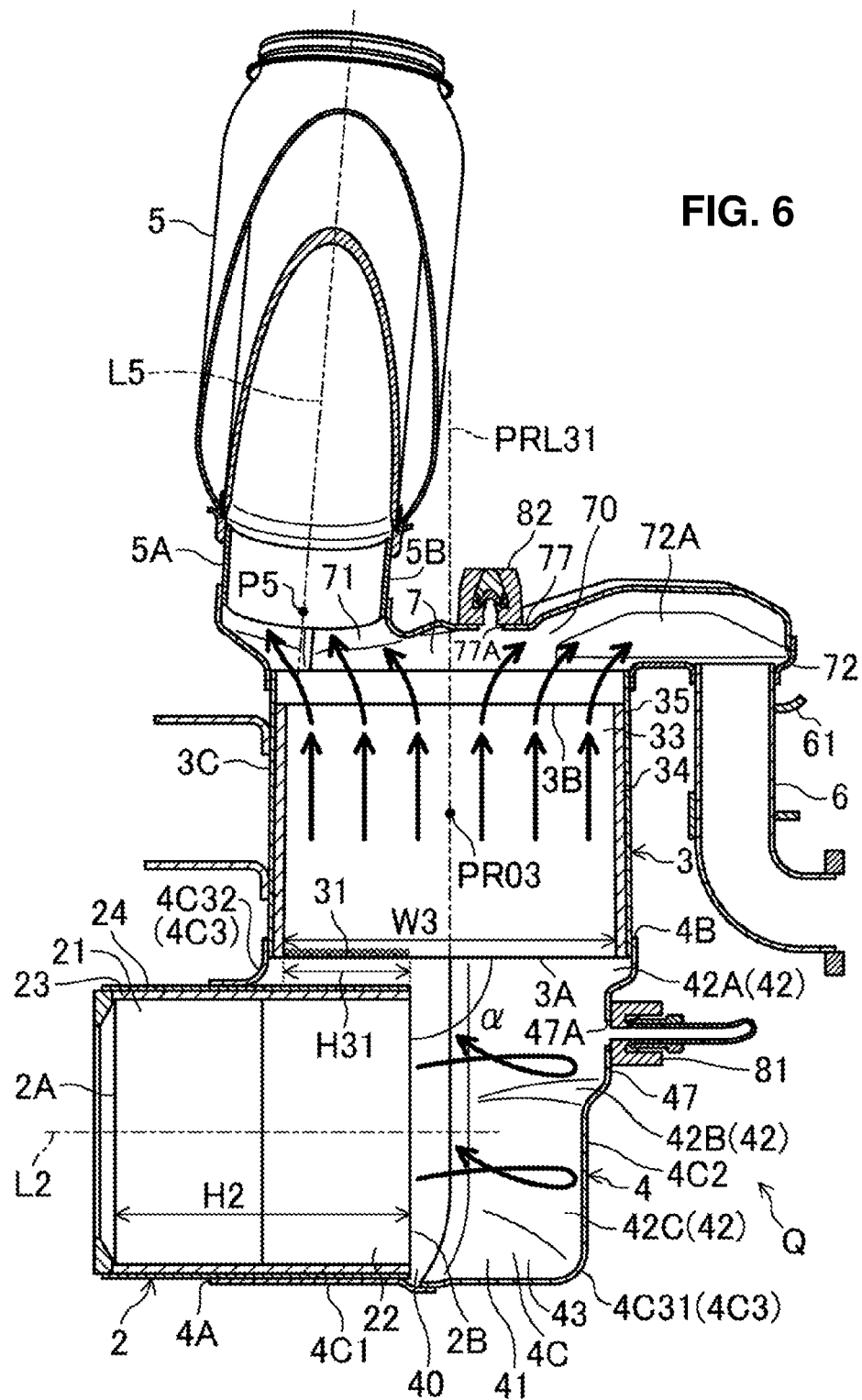
FIG. 6 is a sectional view taken along line VI-VI of FIG. 2.

As shown in FIG. 6, the three-way catalyst 2 is a cylinder-shaped catalyst having a center axis L2. The shape of the three-way catalyst 2 is not limited in particular, but the cylindrical shape is preferable in arranging it in the exhaust path and providing uniform exhaust-gas flowing. A shape of a cross section of the three-way catalyst 2 which is vertical to the center axis L2 is not limited in particular, but any shape, such as a complete round shape, an oval shape, a rectangular shape, or a polygonal shape, is applicable. However, the complete round shape or the oval shape may be preferable in providing the uniform exhaust-gas flowing and reducing a manufacturing cost.

As shown in FIG. 6, a catalyst body of the three-way catalyst 2 which performs purification of the exhaust gas includes an upstream-side end face 2A and a downstream-side end face 2B. The upstream-side end face 2A of the catalyst body and the downstream-side end face 2B of the catalyst body will be sometimes referred to as the upstream-side end face 2A of the three-way catalyst 2 and the downstream-side end face 2B of the three-way catalyst 2 for convenience sake. The both end faces 2A, 2B are of a circular shape having the same diameter.

The three-way catalyst 2 has a two-step structure which comprises a front stage part 21 which is arranged on the upstream side and a rear stage part 22 which is arranged on the downstream side as the catalyst body. The front stage part 21 is a three-way catalyst which is excellent in low temperature activity for purifying the low-temperature exhaust gas during a low-load engine operation of the engine body E. The rear stage part 22 is a three-way catalyst which is excellent in high temperature activity for purifying the high-temperature exhaust gas during a high-load engine operation. While the catalyst 2 is the two-step structure comprising the front stage part 21 and the rear stage part 22 according to the present embodiment, any type of catalyst structure, such as single catalyst structure or a three or more split structure, is applicable.

Further, the three-way catalyst 2 comprises a mat 23 which covers over an outer periphery of the front stage part 21 and the rear stage part 22 as the catalyst body and a cylindrical case 24 which covers over an outer periphery of the mat 23.

The exhaust-gas temperature is about 400° in a light-load engine operation, whereas it is about 800° in a heavy-load engine operation. Accordingly, the three-way catalyst 2 is always disposed to the high-temperature exhaust gas which has passed through the three-way catalyst 2, so that there is a concern that the three-way catalyst 2 may deteriorate because of heat damage.

The mat 23 stably holds the front stage part 21 and the rear stage part 22 as the catalyst body even under an environment where the catalyst body is exposed to the high-temperature exhaust gas, and this mat 23 is made of a material having highly heat resistant properties and heat retaining properties, such as ceramic.

The case 24 holds the catalyst body (the front stage part 21 and the rear stage part 22) and the mat 23, and this case 24 is made of metal, such as stainless steel or iron. Herein, any other known material can be applied for the mat 23 and the case 24.

<GPF>

As shown in FIG. 6, the GPF 3 is arranged on the downstream side of the three-way catalyst 2, which comprises a filter body (purifying device body) 33 for trapping particulate matters (hereafter, referred to as "PM") in the exhaust gas passing through the three-way catalyst 2. While specific descriptions are omitted here, the filter body 33 is made by applying sealing to the honeycomb carrier or the like and adding the filter performance, for example, or it may have a catalyst coat for promoting burning of the trapped PM. When the PM contained in the exhaust gas are trapped at a portioning wall of the filter 33 and the PM accumulates, a post injection in which fuel for increasing the temperature of the filter body 33 is injected into a combustion chamber in an expansion stroke of the engine is conducted after a main fuel injection in which fuel is injected into the combustion chamber for obtaining a power, for example, thereby burning and removing the PM accumulating at the filter body 33. The filter body 33 is not limited to the above-described structure, but any known structure is applicable.

As shown in FIG. 3, the filter body 33 is a cylinder-shaped member having a center axis L3. The shape of the filter body 33 is not limited in particular, but the cylindrical shape is preferable in easily arranging the filter body 33 in the exhaust path and providing uniform exhaust-gas flowing. A shape of a cross section of the filter body 33 which is vertical to the center axis L3 is not limited in particular, but any shape, such as a complete round shape, an oval shape, a rectangular shape, or a polygonal shape, is applicable. However, the complete round shape or the oval shape are preferable in providing the uniform exhaust-gas flowing and reducing a manufacturing cost.

As shown in FIG. 6, the filter body 33 of the GPF 3 comprises an upstream-side end face 3A and a downstream-side end face 3B. The upstream-side end face 3A of the filter body 33 and the downstream-side end face 3B of the filter body 33 will be sometimes referred to as the upstream-side end face 3A of the GPF 3 and the downstream-side end face 3B of the GPF 3 for convenience sake. The both end faces 3A, 3B are of a circular shape having the same diameter.

As shown in FIGS. 3 and 6, a point which is located on the center axis L3 of the GPF 3 at a middle position between the upstream-side end face 3A and the downstream-side end face 3B of the GPF 3 is referred to as a GPF center O3. The center axis L3 of the GPF 3 is the center axis of the filter body 33. Herein, a projection line and a projection point of the center axis L3 and the center O3 of the GPF 3 on the VI-VI cross section are respectively denoted by character references PRL31, PRO3 in FIG. 6 (a sectional view taken along line VI-VI of FIG. 2).

Herein, as shown in FIG. 3, the GPF 3 is disposed laterally such that the center axis L3 extends substantially in a horizontal direction, substantially vertically to the cylinder row direction of the engine body E, i.e., to the lateral direction. Further, the GPF 3 is provided such that the center axis L3 is offset, on the end side in the cylinder row direction (on the leftward side), from the center position, in the cylinder row direction, of the engine body E (reference character LE in FIG. 3 denotes a line which passes through the center position and is perpendicular to the cylinder row direction).

Similarly to the three-way catalyst 2, the GPF comprises the filter body 33, a mat 34 which covers a whole part of an outer periphery of the filter body 33, a tube-shaped case 35 which covers a whole part of an outer periphery of the mat 34, and a downstream-side cover 7 which covers the downstream-side end face 3B of the filter body 33 with a gap space. The tube-shaped case 35 and the downstream-side cover 7 constitute a GPF case which houses the filter body 33. The mat 34 and the tube-shaped case 35 are used for the same purpose as the mat 23 and the case 24 of the three-way catalyst 2 described above, and the same structure is applicable.

<L-shaped Exhaust Pipe>

The L-shaped exhaust pipe 4 is a tube-shaped member which is formed in an L-shaped bent shape and connects the three-way catalyst 2 and the GPF 3, which forms a portion of the exhaust-path.

As shown in FIG. 6, the L-shaped exhaust pipe 4 comprises an upstream-side opening 4A, a downstream-side opening 4B, and a bending portion 4C which is positioned between the both openings 4A, 4B. The bending portion 4C comprises a first tube-shaped portion 4C1 which extends in the cylinder row direction (downstream side) from the upstream-side opening 4A, a second tube-shaped portion 4C2 which extends toward the engine body from the downstream-side opening 4B, and a bending portion 4C3 which connects the first tube-shaped portion 4C1 and the second tube-shaped portion 4C2. The bending portion 4C3 comprises an outer-peripheral-side bending portion 4C31 which is positioned on an outer-peripheral side of L-shaped bending and an inner-peripheral-side bending portion 4C32 which is positioned on an inner-peripheral side of the L-shaped bending.

As shown in FIG. 6, a downstream portion of the three-way catalyst 2 is inserted into the L-shaped exhaust pipe 4 through the upstream-side opening 4A. Meanwhile, an upstream end portion of the GPF 3 is inserted into the L-shaped exhaust pipe 4 through the downstream-side opening 4B.

—Relative Arrangement of Three-Way Catalyst and GPF—

As shown in FIG. 6, the downstream-side end face 2B of the three-way catalyst 2 and the upstream-side end face 3A of the GPF 3 are provided such that a two-face angle α is about 90 degrees at the bending portion 4C. This two-face angle α is not limited to this angle, but in securing the exhaust-gas flowing from the three-way catalyst 2 to the GPF 3 sufficiently, an angle of 60-120 degrees is preferable, an angle of 70-110 degrees is more preferable, and an angle of 80-100 degrees is particularly preferable.

In addition, the three-way catalyst 2 and the GPF 3 are provided such that the downstream portion of the three-way catalyst 2 overlaps a portion of the upstream-side end face of the GPF 3, when viewed in the axial direction of the GPF 3. That is, an overlap portion 31 is formed at the three-way catalyst 2 and the GPF 3.

FIG. 6 is a sectional view taken along line VI-VI of FIG. 2, which shows a cross section which includes the center axis L2 of the three-way catalyst 2 and is parallel to the center axis L3 of the GPF 3, when viewed from the upward side. The cross section shown in FIG. 6 will be referred to as "VI-VI cross section" (cross section). As shown in FIG. 6, a length H31 of the side face of the three-way catalyst 2 which forms the overlap portion 31 relative to a whole length H2 of the three-say catalyst 2 is preferably 10 to 50% in the VI-VI cross section for arranging the tree-way catalyst 2 and the GPF 3 compactly and uniformizing the exhaust-gas flow inside the GPF 3.

Further, the length H31 of the side face of the three-way catalyst 2 relative to a width W3 of the GPF 3 is preferably 10 to 50% in the VI-VI cross section of FIG. 6 for arranging the tree-way catalyst 2 and the GPF 3 compactly and uniformizing the exhaust-gas flow inside the GPF 3.

Thus, by providing the overlap portion 31 of the three-way catalyst 2 and the GPF 3 in a case where the three-way catalyst 2 and the GPF 3 are arranged mutually in the lateral direction, the distance between a position below the exhaust manifold M and the GPF 3 can be made properly short. Further, by controlling (limiting) an area where the overlap portion 31 is provided within the above-described range, the exhaust device 1 can be properly compact and also the use efficiency of the GPF 3, in particular a portion of the GPF 3 which is positioned behind the overlap portion 31, can be properly improved.

—First Pipe Member and Second Pipe Member—

The L-shaped exhaust pipe 4 comprises, as shown in FIG. 6, a first pipe member 40 and a second pipe member 41 which are joined together, providing a joint line thereof at a substantially vertical face which passes around the center of the downstream-side opening 4B. This joint line passes near and on the downstream side of the downstream-side end face 2B of the three-way catalyst 2.

The first pipe member 40 constitutes the upstream-side opening 4A, and the downstream-side opening 4B is constituted by joining of the first pipe member 40 and the second pipe member 41. Specifically, the first pipe member 40 constitutes the upstream-side opening 4A, and constitutes a part of the downstream-side opening 4B and a part of the bending portion 4C, including the inner-peripheral-side bending portion 4C32. The second pipe member 41 constitutes the rest part of the downstream-side opening 4B and the rest part of the bending portion 4C, including the outer-peripheral-side bending portion 4C31.

Since the L-shaped exhaust pipe 4 is constituted by the first pipe member 40 and the second pipe member 41, the L-shaped exhaust pipe 4 is easily formed. Further, since the inner-peripheral-side bending portion 4C32 which has an easy stress-concentration and has a small curvature radius is constituted by the first pipe member 40, that is, the joint line is provided, avoiding a portion where the stress is easily concentrated, the durability of the L-shaped exhaust pipe 4 can be properly secured.

—First Wall Portion and Second Wall Portion—The L-shaped exhaust pipe 4 comprises, as shown in FIG. 6, a first wall portion 42 and a second wall portion 43 which guides the exhaust gas passing through the three-way catalyst 2 to the GPF 3. The first wall portion 42 faces the downstream-side end face 2B of the three-way catalyst 2, and the second wall portion 43 faces the upstream-side end face 3A of the GPF 3 and constitutes the outer-peripheral-side bending portion 4C31.

The first wall portion 42 and the second wall portion 43 are provided at the second pipe member 41 which constitutes the L-shaped exhaust pipe 4. Accordingly, a smooth wall face without any joint line can be formed by the first wall portion 42 and the second wall portion 43, so that turbulence of the exhaust-gas flow can be properly suppressed.

The first wall portion 42 which faces the downstream-side end face 2B of the three-way catalyst 2 comprises, as shown in FIG. 6, an upstream-side wall portion 42C which constitutes the downstream-side opening 4B, a downstream-side wall portion 42A which is continuous to the outer-peripheral-side bending portion 4C31, and a slant wall portion 42B which smoothly connects the both wall portions 42A, 42C. The upstream-side wall portion 42C protrudes toward the three-way catalyst 2 beyond the downstream-side wall portion 42A. In other words, the downstream-side wall portion 42A is configured to be a step portion which is recessed outward. These wall portions 42A, 42B, 42C constitute a part of the second tube-shaped portion 4C2.

Since the upstream-side wall portion 42C protrudes toward the three-way catalyst 2 beyond the downstream-side wall portion 42A, the exhaust gas which has passed through the three-way catalyst 2 and reached the upstream-side wall portion 42C tends to flow toward the central side of the upstream-side end face 3A of the GPF 3. That is, it is prevented that the exhaust-gas flow concentrates on a portion of the GPF 3 which corresponds to an outer-peripheral side of the L-shaped bending of the L-shaped exhaust pipe 4, so that the exhaust-gas flow toward the portion (shade portion) positioned behind the overlap portion 31 of the GPF 3 is induced.

As shown in FIG. 6, a seat portion 47 where an upstream-side exhaust-gas takeout portion 81 of a pressure-difference detector 8, which is shown in FIG. 2 and will be described later, is disposed is provided at the downstream-side wall portion 42A, and an exhaust-gas takeout port 47A for pressure detection is formed at the seat portion 47.

As shown by solid-line arrows in FIG. 6, the exhaust gas passing through the three-way catalyst 2 flows, swirling upward along a wall face of the first wall portion 42, and then flows into the GPF 3 from the L-shaped exhaust pipe 4. Since the downstream-side wall portion 42A of the L-shaped exhaust pipe 4 is spaced apart from the three-way catalyst 2 further than the upstream-side wall portion 42C, a flow speed of the exhaust gas near the downstream-side wall portion 42A is low. Accordingly, the pressure of the exhaust gas on the upstream side of the GPF 3 can be stably detected without receiving influence of the exhaust-gas flow greatly because the exhaust gas is taken out from the upstream-side exhaust-gas takeout portion 81 disposed at the seat portion 47 of the downstream-side wall portion 42A.

Herein, any control device of various sensors or the like other than the upstream-side exhaust-gas takeout portion 81 may be disposed at the seat portion 47. Thereby, the stable detection accuracy can be secured.

<Downstream-Side End Portion of GPF>

Figure 7:
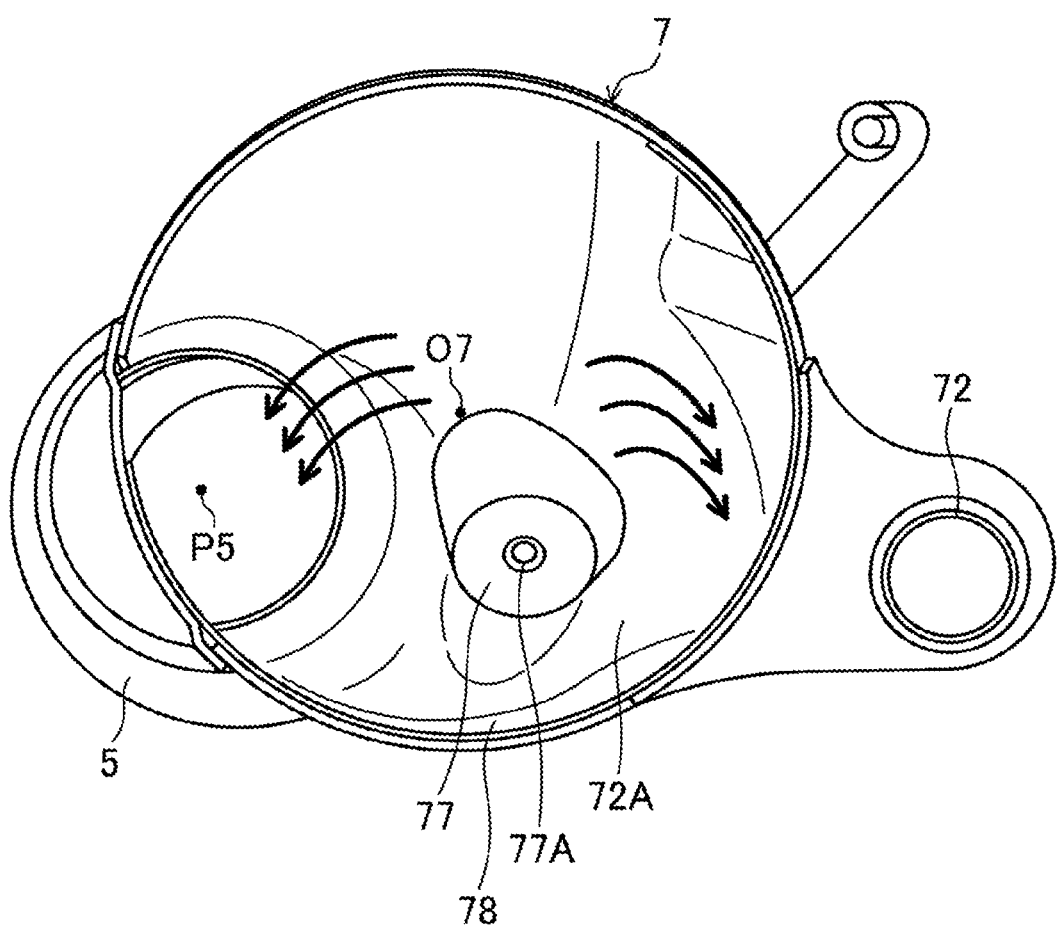
FIG. 7 is a view of a downstream-side end portion of a case of a GPF, when viewed from an upstream side.

As shown in FIGS. 6 and 7, at a downstream-side end portion 7 of the GPF 3 are provided an exhaust-gas discharge port 71 which introduces the exhaust gas passing through the GPF 3 into the exhaust-gas discharge pipe 5 and an EGR-gas takeout port 70 for supplying a part of the exhaust gas to the engine intake system as the EGR gas. An EGR-gas takeout pipe 6 is connected to the EGR-gas takeout port 70 via an EGR-gas introduction portion 72A.

<Exhaust-Gas Discharge Pipe>

The exhaust-gas discharge pipe 5 guides the exhaust gas passing through the GPF 3 to a downstream-side exhaust system, and reserves and drains water which is accompanied by the purification of the exhaust gas by means of the three-way catalyst 2 and the GPF 3.

A line denoted by a reference character PRL31 in FIG. 6 (a sectional view taken along line VI-VI of FIG. 2) is a projection line of the center axis L3 on the VI-VI cross section. Further, a line denoted by a reference character L5 shows a center axis of the exhaust-gas discharge pipe 5. A point denoted by a reference character P5 is the one on the center axis L5 of the exhaust-gas discharge pipe 5 and shows a center of an inlet of the exhaust-gas discharge pipe 5.

As shown in FIG. 6, a center of the exhaust-gas discharge port 71 is offset, on the side of the three-way catalyst 2, from the projection line PRL31 of the center axis L3 of the GPF 3. Whereas, the center P5 of the inlet of the exhaust-gas discharge pipe 5 is also offset, on the side of the three-way catalyst 2, from the projection line PRL31 of the center axis L3 of the GPF 3.

According to this structure, there occurs a flow of the exhaust gas flowing into the GPF 3 which is directed toward the exhaust-gas exhaust pipe 5 as shown by sold-line arrows in FIG. 6. According to this exhaust-gas flow directed toward the exhaust-gas exhaust pipe 5, the amount of the exhaust gas flowing into the portion (shade portion) positioned behind the overlap portion 31 increases. Thereby, the use efficiency of the GPF 3 can be improved.

Herein, the offset quantity of the center P5 of the exhaust-gas discharge pipe 5 can be preferably set so that a right-side face 5A of the exhaust-gas discharge pipe 5, which is positioned on the side of the three-way catalyst 2, is located on the rightward side, i.e., on the side of the three-way catalyst 2, of a GPF side face 3C of the GPF 3, which is positioned on the side of the three-way catalyst 2, on the VI-VI cross section from aspects of improving the use efficiency of the GPF 3 by sufficiently securing the amount of the exhaust gas flowing into the portion positioned behind the overlap portion 31. In this case, it is preferable, from aspects of suppressing an increase of flow resistance around the exhaust-gas discharge pipe 5, that the offset quantity of the exhaust-gas discharge pipe 5 be set so that a left-side face 5B of the exhaust-gas discharge pipe 5 which is positioned on the leftward side is located on the leftward side of the GPF side face 3C of the GPF 3 which is positioned on the side of the three-way catalyst 2 on the VI-VI cross section.

<EGR Device>

The exhaust device 1 comprises the EGR device W to recirculate a part of the exhaust gas to the intake system of the engine for the purpose of preventing an occurrence of nocking or reducing the amount of nitrogen oxide NOx.

The EGR device W comprises, as shown in FIGS. 1, 3 and 4, the EGR-gas takeout pipe 6 (EGR path), a first EGR pipe 62 (EGR path) which is connected to the EGR-gas takeout pipe 6, an EGR cooler 63 (EGR path) which is connected to the first EGR pipe 62, and a second EGR pipe 64 (EGR path) which is connected to the EGR cooler 63. The second EGR pipe 64 is connected to a passage of the engine intake system, and an EGR valve 65 to adjust the circulation amount of the EGR gas is provided at this connection portion.

As shown in FIG. 6, a center of the EGR-gas takeout port 70 is offset, on an opposite side to the exhaust-gas discharge port 71, from the projection line PRL31 which corresponds to the center axis L3 of the GPF 3. The EGR-gas takeout pipe 6 is connected to an EGR-gas introduction port 72 of a tip portion of the EGR-gas introduction portion 72A which protrudes toward a side of the GPF 3 (toward an opposite side to an arrangement side of the exhaust-gas discharge pipe 5). The EGR-gas takeout pipe 6 extends from the EGR-gas introduction port 72 toward the engine-body side on the side of the GPF 3, in parallel to the center axis of the GPF 3, and is bent toward the side of the GPF 3, being spaced apart from the GPF 3, and continuous to the first EGR pipe 62.

Thereby, as shown by solid-line arrows in FIG. 6, the EGR gas can be taken out in an inertia direction of the exhaust gas when the exhaust gas discharged out of the three-way catalyst 2 passes through the L-shaped exhaust pipe 4. Accordingly, the sufficient amount of EGR gas can be secured. Further, the EGR can be taken out, suppressing mutual interference with the exhaust-gas flow to the exhaust-gas discharge pipe 5. Moreover, the exhaust-gas flow in the GPF 3 can be dispersed laterally and uniformized, so that the use efficiency, function, performance of the GPF 3 can be further improved.

A seat portion 77 where the downstream-side exhaust-gas takeout port 77A opens is provided at a portion between the exhaust-gas discharge port 71 and the EGR-gas takeout port 70 at the downstream-side cover 7 of the GPF 3, and a downstream-side exhaust-gas takeout portion 82 of the pressure-difference detector 8, which will be described later, is provided at this seat portion 77. The flow of the exhaust gas is branched into a side of the exhaust-gas discharge port 71 and a side of the EGR-gas takeout port 70 around the seat portion 77, where the flow speed of the exhaust gas tends to be slow and uniform. Accordingly, the pressure of the exhaust gas can be stably detected without receiving influence of the exhaust-gas flow greatly because the exhaust gas is taken out from the downstream-side exhaust-gas takeout portion 82 disposed at the seat portion 47 of the downstream-side wall portion 42A.

As shown in FIG. 7, a space portion 78 having a bottom portion which is positioned at a lower level than the EGR-gas takeout port 70 is formed at a portion between the EGR-gas takeout port 70 and the exhaust-gas discharge port 71 and below the seat portion 77. Even if the condensed water generated in the EGR-gas takeout pipe 6 flows reversely, this water stays in the space portion 78, so that it can be prevented that the EGR-gas takeout port 70 and the EGR-gas introduction portion 72A are closed with the condensed water.

As shown in FIGS. 2 and 4, the EGR-gas takeout pipe 6 and the case of the GPF 3 are joined by the first support member 38. The EGR-gas takeout pipe 6 is supported at an engine-related component (not illustrated), such as a transmission or a power diving device, by the second support member 61 at a portion thereof which is positioned between a joint portion to the EGR-gas takeout port 70 and another joint portion to the first support member 38. Accordingly, the GPF 3 is supported at the engine-related component via the first support member 38, the EGR-gas takeout pipe 6, and the second support member 61.

Further, the EGR device W and the EGR-gas introduction portion 72A are arranged on the side of the outer-peripheral-side bending portion 4C31 (on the outer-peripheral side of the L-shaped bending of the L-shaped exhaust pipe 4) of the L-shaped exhaust pipe 4, and the exhaust-gas discharge pipe 5 where the more amount of exhaust gas flows, compared to the EGR device W, is connected to the GPF 3 on the side of the inner-peripheral-side bending portion 4C32 (on the inner-peripheral side of the L-shaped bending) of the L-shaped exhaust pipe 4. Thereby, the exhaust gas possibly flows into the portion (shade portion) positioned behind the overlap portion 31 efficiently as well, so that the use efficiency of the GPF 3 increases.

Further, as shown in FIG. 7, the EGR-gas introduction portion 72A is positioned below a center position O7 of the downstream-side cover 7 of the GPF 3. Further, the EGR path constituted by the EGR-gas takeout pipe 6, the first EGR pipe 62, the EGR cooler 63, and the second EGR pipe 64 extends upward from its base end side connected to the EGR-gas introduction port 72 to its tip side connected to the engine intake system. Thereby, the condensed water generated inside the EGR path can be prevented from staying in the path.

Further, since the GPF 3 is provided such that the center O3 of the GPF 3 is offset, on the one side (leftward) in the cylinder row direction, from the center position, in the cylinder row direction, of the engine body E as described above, the EGR path can be made properly simple.

<Pressure-Difference Detector>

The pressure-difference detector 8 shown in FIG. 2 is a sensor to detect a pressure difference of the exhaust gas between the upstream side and the downstream side of the filter body 33 of the GPF 3, and the amount of PM accumulating at the filter body 33 is calculated based on the pressure difference detected.

The pressure-difference detector 8 comprises the upstream-side exhaust-gas takeout portion 81 which takes out the exhaust gas positioned on the upstream side of the filter body 33, the downstream-side exhaust-gas takeout portion 82 which takes out the exhaust gas positioned on the downstream side of the filter body 33, and a pressure-difference sensor (pressure-difference detection portion) 83 which detects the pressure difference from the pressures of the exhaust gas taken out from the takeout portions 81, 82.

The upstream-side exhaust-gas takeout portion 81 is provided at the seat portion 47 of the L-shaped exhaust pipe 4 as described above. Whereas, the downstream-side exhaust-gas takeout portion 82 is provided at the seat portion 77 of the downstream-side cover 7 of the GPF 3 as described above. The upstream-side exhaust-gas takeout portion 81 and the pressure-difference sensor 83 are connected by an upstream-side exhaust-gas takeout pipe 81A shown in FIGS. 2 and 4. The downstream-side exhaust-gas takeout portion 82 and the pressure-difference sensor 83 are connected by a downstream-side exhaust-gas takeout pipe 82A.

As shown in FIG. 2, the upstream-side exhaust-gas takeout pipe 81A comprises a takeout pipe 81A1 and another takeout pipe 81A2 which is connected to the takeout pipe 81A1. Further, the downstream-side exhaust-gas takeout pipe 82A comprises a takeout pipe 82A1 and another takeout pipe 82A2 which is connected to the takeout pipe 82A1.

As shown in FIG. 3, a first support member 85 is fixed to the L-shaped exhaust pipe 4, a second support member 84 shown in FIG. 4 is fixed to the first support member 85, and the pressure-difference sensor 83 is supported at the second support member 84 via the pressure-difference sensor attaching plate 83A. The second support member 84 is fixed to the cylinder block E1 as shown in FIG. 2. Since the second support member 84 is joined to the cylinder block E1 and the L-shaped exhaust pipe 4, this second support member 84 is commonly used for supporting of the pressure-difference sensor 83 and the L-shaped exhaust pipe 4 by the cylinder block E1.

As shown in FIG. 4, the pressure-difference sensor 83 and the upstream-side exhaust-gas takeout portion 81 are arranged on one side (on the same leftward side as an arrangement side of the EGR-gas takeout pipe 6) of the GPF 3. Therefore, the upstream-side exhaust-gas takeout pipe 81A can be arranged on one side of the GPF 3 like the EGR-gas takeout pipe 6. Further, a takeout-pipe support member 81A3 which supports the upstream-side exhaust-gas takeout pipe 81A is fixed to the first support member 38 to support the GPF 3 and the EGR-gas takeout pipe 6. Accordingly, the upstream-side exhaust-gas takeout pipe 81A is supported by the second support member 61 to support the GPF 3 and the EGR-gas takeout pipe 6. Thus, the performance of compactness and layout of the device can be improved by supporting the upstream-side exhaust-gas takeout pipe 81A by utilizing the second support member 61.

Other Embodiments

While the exhaust device 1 of the first embodiment is applied to the FF vehicle, the present invention is applicable to a FR vehicle by configuring the exhaust device such that the independent exhaust pipes of the exhaust manifold M which are connected to the four exhaust ports extend rearward and join together and then extend rearward at a central side, in the vehicle width direction, of the engine body E.

While the upstream-side exhaust-gas purifying device is the three-way catalyst 2 and the downstream-side exhaust-gas purifying device is the GPF 3 in the first embodiment, any other types of exhaust-gas purifying device are applicable. For example, in a case where the exhaust device 1 is applied to the diesel engine, a diesel particulate filter is useable in place of the GPF. Further, the upstream-side exhaust-gas purifying device may be configured as an oxidation catalyst and the downstream-side exhaust-gas purifying device may be configured as a NOx-purification catalyst, or its reverse is possible as well.

While the downstream end outlet of the exhaust manifold M is provided on the side of the first cylinder, in the cylinder row direction, of the engine and the upstream-side opening 4A of the L-shaped exhaust pipe 4 is directed to the side of the first cylinder in the cylinder row direction according to the first embodiment, the upstream-side opening 4A may be directed to any other direction according to the vehicle layout, for example, directed to the fourth-cylinder side, the upward side, or the downward side.

The exhaust device of the engine provided with EGR device according to the present invention can properly suppress the interference with the flow of the exhaust gas discharged from the exhaust-gas purifying device toward the exhaust-gas discharge port and also securely take out the EGR gas from the downstream side of the exhaust-gas purifying device.

What is claimed is:

1. An exhaust device of an engine, comprising:
an exhaust-gas purifying device provided on an exhaust path of the engine and comprising a purifying-device body to purify exhaust gas discharged from the engine which is housed in a case thereof; and
an EGR device connected to a downstream side, in an exhaust-gas flow direction, of the exhaust-gas purifying device and recirculating a part of the exhaust gas passing through the purifying-device body as EGR gas to an intake system of the engine via a pipe, wherein
an exhaust-gas discharge port is provided at a downstream-side end portion of said case of the exhaust-gas purifying device,
an EGR-gas takeout port is provided at the downstream-side end portion of said case of the exhaust-gas purifying device,
the exhaust-gas discharge port is provided at a position which is offset from a center axis of the purifying-device body,
the EGR-gas takeout port is provided at a position which is offset from the center axis of the purifying-device body on a side of the center axis of the purifying-device body that is opposite the position of the exhaust-gas discharge port to thereby suppress interference with the exhaust gas flow to the exhaust-gas discharge port, and
said EGR device is provided on a same side of the center axis of the purifying-device body as the position of said EGR-gas takeout port.

2. The exhaust device of the engine of claim 1, wherein a downstream portion of an L-shaped exhaust pipe which is configured to be bent in a L shape is connected to an upstream side, in the exhaust-gas flow direction, of the exhaust-gas purifying device, and said EGR-gas takeout port is offset, on an outer-peripheral side of L-shaped bending of said L-shaped exhaust pipe, from the center axis of said purifying-device body.

3. The exhaust device of the engine of claim 2, further comprising an upstream-side exhaust-gas purifying device which is connected to an upstream portion of said L-shaped exhaust pipe, wherein a downstream portion of said upstream-side exhaust-gas purifying device is configured to overlap a portion of an upstream-side end face of said exhaust-gas purifying device, when viewed in an axial direction of the exhaust-gas purifying device.

4. The exhaust device of the engine of claim 3, wherein said EGR-gas takeout port is provided below a center of said downstream-side end portion of the case of the exhaust-gas purifying device, and an EGR path of said EGR device is configured to extend upward from a base end side thereof which is connected to said EGR-gas takeout port to a tip side thereof which is connected to the intake system.

5. The exhaust device of the engine of claim 4, wherein a space portion which has a bottom portion positioned below said EGR-gas takeout port is formed inside said case at a position located on a downstream side of said purifying-device body.

6. The exhaust device of the engine of claim 4, further comprising a first support member which connects the case of said exhaust-gas purifying device and an EGR pipe constituting said EGR path and a second support member which supports a portion of the EGR pipe which is located between said EGR-gas takeout port and a connection portion where said first support member is connected.

7. The exhaust device of the engine of claim 5, further comprising a first support member which connects the case of said exhaust-gas purifying device and an EGR pipe constituting said EGR path and a second support member which supports a portion of the EGR pipe which is located between said EGR-gas takeout port and a connection portion where said first support member is connected.

8. The exhaust device of the engine of claim 2, wherein said engine is an in-line multi-cylinder engine, and said exhaust-gas purifying device is provided such that the center axis of said purifying-device body is vertical to a cylinder row direction of the engine and is offset on a same side of a center position of the engine, in the cylinder row direction, as said EGR device.

9. The exhaust device of the engine of claim 3, wherein said engine is an in-line multi-cylinder engine, and said exhaust-gas purifying device is provided such that the center axis of said purifying-device body is vertical to a cylinder row direction of the engine and is offset on a same side of a center position of the engine, in the cylinder row direction, as said EGR device.

10. The exhaust device of the engine of claim 4, wherein said engine is an in-line multi-cylinder engine, and said exhaust-gas purifying device is provided such that the center axis of said purifying-device body is vertical to a cylinder row direction of the engine and is offset on a same side of a center position of the engine, in the cylinder row direction, as said EGR device.

11. The exhaust device of the engine of claim 5, wherein said engine is an in-line multi-cylinder engine, and said exhaust-gas purifying device is provided such that the center axis of said purifying-device body is vertical to a cylinder row direction of the engine and is offset on a same side of a center position of the engine, in the cylinder row direction, as said EGR device.

12. The exhaust device of the engine of claim 6, wherein said engine is an in-line multi-cylinder engine, and said exhaust-gas purifying device is provided such that the center axis of said purifying-device body is vertical to a cylinder row direction of the engine and is offset on a same side of a center position of the engine, in the cylinder row direction, as said EGR device.

13. The exhaust device of the engine of claim 7, wherein said engine is an in-line multi-cylinder engine, and said exhaust-gas purifying device is provided such that the center axis of said purifying-device body is vertical to a cylinder row direction of the engine and is offset on a same side of a center position of the engine, in the cylinder row direction, as said EGR device.

* * * * *